Dec. 13, 1949 R. D. ACTON 2,491,353
BALE LOADER
Filed Oct. 15, 1945
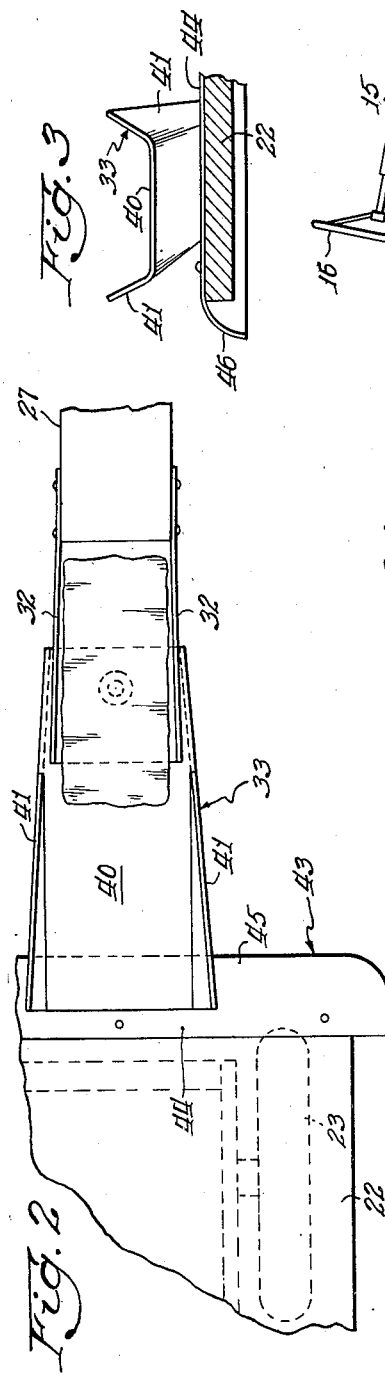
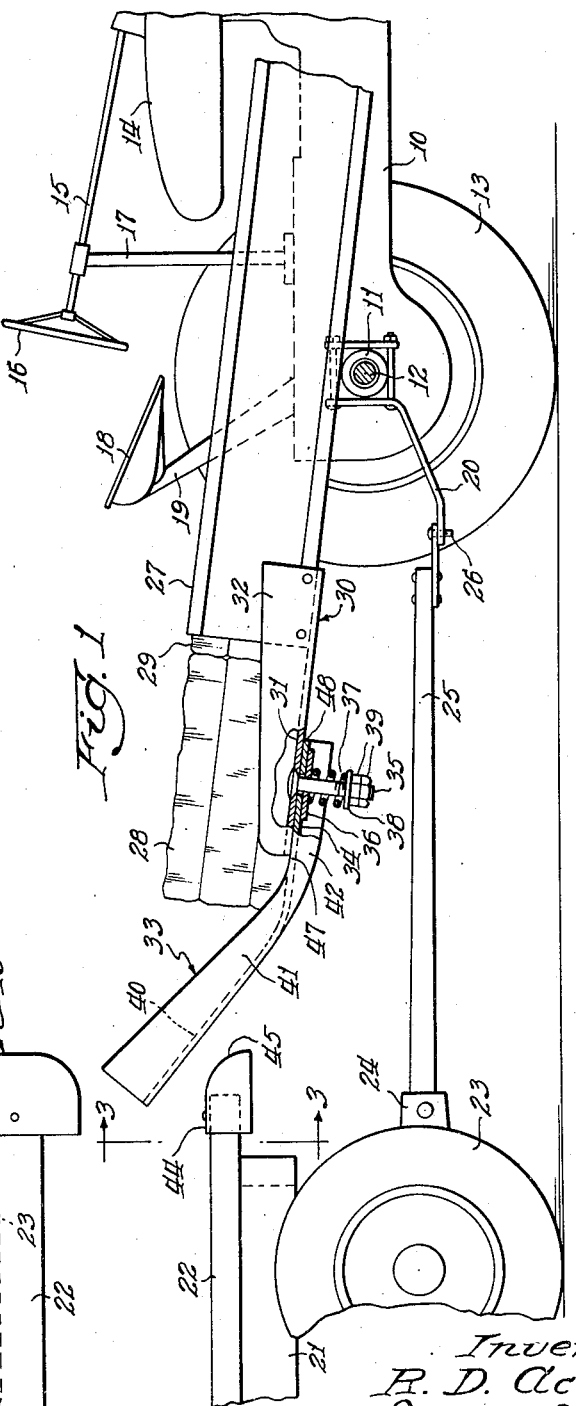
Inventor:
R. D. Acton
By: Paul O. Pippel
Atty.

Patented Dec. 13, 1949

2,491,353

UNITED STATES PATENT OFFICE 2,491,353

BALE LOADER

Russel D. Acton, Chicago, Ill.

Application October 15, 1945, Serial No. 622,404

3 Claims. (Cl. 214—42)

This invention relates to a bale loader. More specifically it relates to a device for transferring bales from a traveling pick-up baler to a trailing vehicle. In the use of pick-up balers which travel through the field gathering and baling loose material, the bales are ordinarily left on the ground, thus requiring a separate operation of picking up and loading the bales on a collecting vehicle. It has been proposed that a trail-behind wagon be used onto which the bales are delivered from the baler.

The object of the present invention is to provide an improved bale transferring means for delivering bales from a traveling pick-up baler to a trail-behind vehicle.

A more specific object is to provide means for permitting movement of the trailing vehicle vertically relative to the baler structure, particularly the bale delivering end thereof.

Another specific object is to provide a bale delivery chute which is angularly adjustable so as to permit the delivery of bales in laterally spaced locations on a trailing vehicle, thereby requiring a minimum amount of handling and rearrangement of the bales.

Other objects and the means by which they are attained will be apparent from the drawings and the detailed description thereof.

In the drawings:

Figure 1 is a side elevation showing portions of a tractor-mounted baler together with a trailing vehicle connected to the tractor and a bale mechanism of the invention;

Figure 2 is a plan view of a portion of the structure shown in Figure 1; and

Figure 3 is a section taken substantially on the line 3—3 of Figure 1.

As this invention resides in a bale transferring structure, only the rear portion of a tractor-mounted baler has been illustrated along with the front portion of a trailing vehicle. The tractor structure shown includes a longitudinally extending body 10 having rear axle housing structures 11, one of which is shown, and drive axles 12, one of which is shown in section, the wheel being removed at the inner side, one wheel 13, illustrated, and the other as stated being removed to better show the tractor and bale structure.

The tractor is provided with a gasoline tank 14, a steering column 15 on which steering wheel 16 is mounted, said column being retained in position by a support 17. An operator's seat 18 is carried on the tractor by means of a support 19.

A rearwardly extending draw-bar 20 is illustrated as being rigidly secured to the axle housing structure 11.

A trailing vehicle, illustrated as a flat-top wagon, includes a frame 21, a flat-top 22, supporting wheels 23, one of which is shown, a draft structure 24, and a tongue 25 pivotally connected by a pin 26 to the draw-bar 20 of the tractor.

Pick-up balers which travel through the field being either self-propelled or drawn by a tractor have come into extensive use during the last ten years, this now being the most prevalent way of handling hay in many sections of the country. This invention is apropos to any traveling pick-up baler, it being shown, however, in connection with a tractor-mounted baler structure, only the rear portion of a baling chamber 27 being illustrated. In the operation of such a pick-up baler, the tied bales are delivered rearwardly through the open end of the bale chamber 27. One complete bale 28 is illustrated which is emerged from the bale chamber and another bale 29 is indicated as projecting beyond the bale chamber.

To receive the bales from the bale chamber the platform or table 30, having a flat bottom wall 31 and upwardly extending side walls 32 is rigidly secured to the rear end of the baling chamber in overlapping relation with respect thereto. The side walls are slightly angled in an outward direction as shown in Figure 3.

A transfer chute, indicated in its entirety by the reference character 33, has a substantially horizontal bottom wall 34 which is fitted beneath the bottom wall 31 of the table 30. The headed bolt 35 extends through alined openings formed in the bottom walls 31 and 34. An apertured reinforcing plate 36 is also fitted over the bolt 35 in contact with the underneath surface of the bottom wall 34. A compression spring 37 surrounds the bolt 35 in contact with the plate 36. A washer 38 abutting the lower end of the spring 37 is held in position by nuts 39 threaded on the bolt 35.

The bottom wall 34 of the transfer chute 33 continues rearwardly with a smooth curvature connecting with an upwardly and rearwardly extending bottom wall 40. Sidewalls 41 are connected to the outer edges of the bottom wall 40 extending angularly outwardly as best shown in Figure 3. Said walls continue rearwardly to form side walls or flanges 42 which reinforce the rear bottom wall 34. It will be noted that the walls 42 terminate at their upper edges with the upper surface of the bottom wall 34 to permit angular movement of the delivery chute 33 about the securing bolt 35 as an axis.

At the forward end of the flat-top 22 of the trailing vehicle a guide member 43 is secured with its upper wall 44 overlying the front upper surface of said flat-top 22. The member 43 is formed with a forwardly and downwardly extending curved portion 45 adapted to abut and engage the bottom wall 40 of the transfer chute 33. The ends of the member 43 are curved and are provided with outwardly and downwardly curved portions 46.

In the operation of a bale transferring device, as above described, the bales being delivered from the bale chamber 27 are pushed rearwardly onto the table 30, as shown in Figure 1. As the baler continues to operate the bale 28 moves rearwardly engaging the angular bottom wall 40 of the transfer chute 33. The compression spring 37 is not intended to have sufficient force to hold the transfer chute against the weight of the bale. Said spring is therefore compressed when the bale bears against the angular bottom wall 40 and the delivery chute drops down against the member 43 and more specifically against the curved contact portion 45 formed thereon. Movement of the bales emerging from the bale chamber continues to move the completed bales rearwardly delivering them successively over the transfer chute onto the flat-top 22 of the trailing vehicle. Several bales may be delivered onto the wagon before it is necessary to stack the bales at the rear of the trailing vehicle or to move the angular position of the transfer chute.

It will be understood that an operator may angularly shift the transfer chute 33 so as to deliver bales to the center or to either side of the trailing vehicle by providing conventional side walls on the wagon, and by providing delivery chutes of different lengths, a large number of bales may be loaded onto a trailing vehicle with a minimum amount of manual labor. A man may ride the wagon and stack the bales as delivered, or the operator of the tractor may periodically dismount and arrange the bales which have been delivered to the trailing vehicle.

Except when the weight of a bale is on the transfer chute 33, it is not in contact with the trailing vehicle. However, when ground irregularities are encountered causing rising of the trailing vehicle with respect to the tractor, the contact portion 45 of the member 43 merely engages the transferring chute 33 deflecting it upwardly and compressing the spring 37 without any damage to the structure. This mounting which permits resilient movement of the transfer chute 33 in either vertical direction with respect to its normal position is the significant feature of the invention. At the same time the single mounting means provides for angular adjustment of the transfer chute so as to deliver bales at laterally spaced locations on the trailing vehicle.

In vertical movement of the delivery chute 33 pivoting action takes place when the chute is moved upwardly about the forward end of the bottom wall 31 at the point indicated by the reference character 47. When the vertical movement of the chute is downwardly, pivoting action takes place about the rear edge of the bottom wall 34 at the point indicated by the reference character 48. It will be noted that the opening through the bottom wall 34 is shown as having sufficient clearance to permit these pivoting actions without binding action on the bolt 35.

Figure 3 indicates the transfer chute 33 as swung laterally over to one side of the trailing vehicle. Said figure also serves to illustrate the function of the curved portion 46 on the member 43. When a short turn is made with the baler, the front end of the wagon may be shifted laterally almost at right angles to the tractor. This means that the delivery chute swings over the front corners of the wagon. If at the same time ground irregularities are encountered, the sides of the transfer chute might engage the sides of the flat top 22 of the trailing vehicle. For this reason the curved portions 46 are provided at the ends of the member 43 so as to engage the angled side walls 41 in case such a position is reached during short turning of the tractor. A camming action is provided to thereby slide the chute back into position over the flat top 22 of the vehicle.

It is to be understood that applicant has shown and described only a preferred embodiment of his bale transferring device and that he claims as his invention all modifications falling within the scope of the appended claims.

What is claimed is:

1. In a traveling pick-up baler having a trailing vehicle therebehind, means for delivering bales to said vehicle comprising in combination with the baler and the vehicle, a bale receiving table extending rigidly from the rear of the baler, an upwardly and rearwardly extending delivery chute pivotally connected to said platform by structure providing for pivotable swinging movement about a vertical axis, said structure also providing for resilient vertical pivoting movement of the discharge end of the chute in an upward direction, said chute extending over the front end of the vehicle, said vertical pivoting of said chute permitting lateral swinging by an operator to deliver bales at different locations laterally of the trailing vehicle, said vehicle being provided with contact means against which said chute rests when a bale is pushed thereagainst or when the wagon moves vertically with respect to the tractor in an upward direction, said contact means also being curved downwardly at the ends to provide for a short turn of the baler relative to the tractor with subsequent picking up of the chute from the underneath side thereof by the contact means.

2. In a traveling pick-up baler having a trailing vehicle therebehind, means for delivering bales to said vehicle comprising in combination with the baler and the vehicle, a bale receiving table extending rigidly from the rear of the baler, an upwardly and rearwardly extending delivery chute pivotally connected to said platform by structure providing for pivotable swinging movement about a vertical axis, said structure also providing for resilient vertical pivoting movement of the discharge end of the chute in an upward direction, said chute extending over the front end of the vehicle, said vertical pivoting of said chute permitting lateral swinging by an operator to deliver bales at different locations laterally of the trailing vehicle, said vehicle being provided with contact means against which said chute rests when a bale is pushed thereagainst or when the wagon moves vertically with respect to the tractor in an upward direction, said contact means also being curved downwardly at the ends to provide for a short turn of the baler relative to the tractor with subsequent picking up of the chute from the underneath side thereof by the contact means, said chute having upwardly flared sides diverging in a rearward direction.

3. In a traveling pick-up baler having a trailing vehicle connected at the rear thereof by a hitch permitting pivoting on vertical and horizontal axes, means for delivering bales to said vehicle comprising in combination with the baler and the vehicle, a bale receiving table extending rigidly from the rear of the baler, an upwardly and rearwardly extending delivery chute pivotally connected to said platform by structure providing for pivotable swinging movement about a vertical axis, said structure also providing for resilient vertical pivoting movement of the discharge end of the chute in either direction, said chute extending over the front end of the vehicle, said vehicle being provided with a forwardly and downwardly curved contact plate against which said chute rests when a bale is pushed thereagainst or when the wagon moves vertically with respect to the tractor in an upward direction, said contact plate also being curved downwardly at the ends to provide for a short turn of the baler relative to the tractor with subsequent picking up of the chute from the underneath side thereof by the contact plate, said chute having upwardly flared sides diverging in a rearward direction, said vertical pivot mounting of said chute permitting lateral swinging by an operator to deliver bales at different locations laterally of the trailing vehicle.

RUSSEL D. ACTON.

REFERENCES CITED

The following references are of record in the file of this patent:

UNITED STATES PATENTS

| Number | Name | Date |
| --- | --- | --- |
| 401,032 | Heckmann | Apr. 9, 1889 |
| 769,898 | Gibson | Sept. 13, 1904 |
| 861,534 | Peters | July 30, 1907 |
| 889,023 | Leschinski | May 28, 1908 |
| 998,724 | Townsend | July 25, 1911 |
| 1,644,521 | Hamm | Oct. 4, 1927 |
| 2,208,128 | Holbrook et al. | July 16, 1940 |
| 2,390,306 | Hunziker | Dec. 4, 1945 |

FOREIGN PATENTS

| Number | Country | Date |
| --- | --- | --- |
| 10,183 | Germany | Dec. 13, 1879 |